(12) United States Patent
Derschmidt et al.

(10) Patent No.: US 10,816,379 B2
(45) Date of Patent: Oct. 27, 2020

(54) COOLABLE DEVICE FOR MEASURING THROUGH-FLOW PROCESSES OF FLUIDS

(71) Applicant: AVL LIST GMBH, Graz (AT)

(72) Inventors: Otfried Derschmidt, Graz (AT); Heribert Kammerstetter, Salzburg (AT); Manfred Pross, Graz (AT)

(73) Assignee: AVL LIST GMBH, Graz (AT)

( * ) Notice: Subject to any disclaimer, the term of this patent is extended or adjusted under 35 U.S.C. 154(b) by 275 days.

(21) Appl. No.: 15/759,523

(22) PCT Filed: Sep. 15, 2016

(86) PCT No.: PCT/EP2016/071753
§ 371 (c)(1),
(2) Date: Mar. 13, 2018

(87) PCT Pub. No.: WO2017/046197
PCT Pub. Date: Mar. 23, 2017

(65) Prior Publication Data
US 2019/0145809 A1 May 16, 2019

(30) Foreign Application Priority Data
Sep. 15, 2015 (AT) .................................. A 603/2015

(51) Int. Cl.
*G01F 3/10* (2006.01)
*F04C 15/00* (2006.01)
*G01F 15/02* (2006.01)
*F04C 2/10* (2006.01)

(52) U.S. Cl.
CPC .................. *G01F 3/10* (2013.01); *F04C 2/10* (2013.01); *F04C 15/0096* (2013.01); *G01F 15/026* (2013.01); *F04C 2/102* (2013.01); *F04C 2210/203* (2013.01); *F04C 2220/24* (2013.01)

(58) Field of Classification Search
CPC ....................................................... G01F 3/10
See application file for complete search history.

(56) References Cited

U.S. PATENT DOCUMENTS

| | | | |
|---|---|---|---|
| 3,633,420 A | 1/1972 | Holzem | |
| 2003/0152474 A1 | 8/2003 | Luigi | |
| 2005/0216178 A1 | 9/2005 | Graf et al. | |
| 2006/0201244 A1* | 9/2006 | Metzler | G01F 3/16 |
| | | | 73/239 |

(Continued)

FOREIGN PATENT DOCUMENTS

| | | |
|---|---|---|
| CN | 1673709 A | 9/2005 |
| CN | 1820184 A | 8/2006 |

(Continued)

*Primary Examiner* — Clayton E. LaBelle
*Assistant Examiner* — Dennis Hancock
(74) *Attorney, Agent, or Firm* — Norman B. Thot

(57) ABSTRACT

A device for measuring through-flow processes of fluids. The device includes an inlet, an outlet, a flow housing in which a fluid flows, a drivable displacement meter in the flow housing, a bypass line which bypasses the drivable displacement meter, a pressure difference sensor in the bypass line and in the flow housing, an evaluation and control unit which controls the drivable displacement meter based on a pressure difference existing at the pressure difference sensor, and a cooling channel in the flow housing which has a coolant flow therethrough.

13 Claims, 6 Drawing Sheets

(56) References Cited

U.S. PATENT DOCUMENTS

| | | | | |
|---|---|---|---|---|
| 2012/0024080 A1* | 2/2012 | Carbone, II | ............... | G01F 3/10 |
| | | | | 73/861.04 |
| 2012/0024892 A1* | 2/2012 | Bartlett | ................... | B67D 7/04 |
| | | | | 222/54 |
| 2012/0297867 A1* | 11/2012 | Kammerstetter | .... | F02M 65/001 |
| | | | | 73/114.51 |

FOREIGN PATENT DOCUMENTS

| | | |
|---|---|---|
| CN | 201348401 Y | 11/2009 |
| CN | 201739172 U | 2/2011 |
| CN | 202484268 U | 10/2012 |
| CN | 103732884 A | 4/2014 |
| DE | 1 773 608 A1 | 3/1972 |
| DE | 1 798 080 B1 | 10/1973 |
| DE | 101 17 373 A1 | 10/2002 |
| DE | 103 31 228 B3 | 1/2005 |
| DE | 10 2006 033 028 A1 | 1/2008 |
| EP | 1 334 816 A1 | 8/2003 |
| JP | 61-226583 A | 10/1986 |
| JP | 2004-3441 A | 1/2004 |
| JP | 2008-23995 A | 2/2008 |
| JP | 2009-513858 A | 4/2009 |
| WO | WO 2004/036050 A1 | 4/2004 |
| WO | WO 2011/073024 A1 | 6/2011 |
| WO | WO 2014/206767 A1 | 12/2014 |

\* cited by examiner

COOLABLE DEVICE FOR MEASURING THROUGH-FLOW PROCESSES OF FLUIDS

CROSS REFERENCE TO PRIOR APPLICATIONS

This application is a U.S. National Phase application under 35 U.S.C. § 371 of International Application No. PCT/EP2016/071753, filed on Sep. 15, 2016 and which claims benefit to Austrian Patent Application No. A 603/2015, filed on Sep. 15, 2015. The International Application was published in German on Mar. 23, 2017 as WO 2017/046197 A1 under PCT Article 21(2).

FIELD

The present invention relates to a device for measuring through-flow processes of fluids, comprising an inlet, an outlet, a flow housing, in which the fluid flows, a drivable displacement meter, which is arranged in the flow housing, a bypass line, via which the displacement meter can be bypassed, a pressure difference sensor, which is arranged in the bypass line and is arranged in the flow housing, and an evaluation and control unit, via which the drivable displacement meter can be controlled in accordance with the pressure difference present at the pressure difference sensor.

BACKGROUND

Such devices have been known for several years and are used, for example, to inject a quantity measurement in internal combustion motors.

The original version of such a device for through-flow measurement was described in DE-AS 1 798 080. This electronically controlled flow meter comprises a main conduit with an inlet and an outlet, in which a rotary displacement meter in the form of a gear pump is arranged. A bypass line runs parallel to the main conduit, via which bypass line the rotary displacement meter can be bypassed and in which a piston serving as a pressure difference sensor is arranged in a measuring chamber. The excursion of the piston in the measuring chamber is measured using an optical sensor to determine the flow rate. The rotational speed of the gear pump is constantly readjusted via an evaluation and control unit based on this signal, the readjustment being such that the piston is always returned to its initial position, if possible, so that only small flows are generated in the bypass. The flow rate within a predefined time interval is calculated in this manner from the number of rotations or partial rotations of the gear pump measured by an encoder and from the known delivery quantity of the gear pump per revolution.

A flow quantity measuring device of this structure is also described in DE 103 31 228 B3. For determining the exact injection quantity profiles, the gear pump is set to a constant rotational speed prior to the start of each injection, so that the movement of the piston is measured subsequently, with this excursion being used to determine the injection profiles. A pressure sensor and a temperature sensor are also arranged in the measuring chamber, the measuring values of which are also supplied to the computing unit to calculate and to correct the injection quantity profiles.

A flow sensor is further described in DE 1 773 608 A in which a rotary displacement meter also serves to measure the flow rate of viscous media at high temperatures. While the flow meter is maintained at a high temperature by a heating jacket, the drive unit is provided with cooling ribs. The differential pressure measurement is performed using a transfer liquid onto which the pressure of the measuring liquid is transferred via membranes. Pipes through which a coolant flows are also arranged between the displacement meter and its drive to provide a thermal separation of the displacement meter from its drive, which pipes are also in contact with the pressure difference sensor.

No solutions currently exist to prevent an overheating of electronic components and an undesired heating of the housings by the possibly hot measuring fluid so as to provide temperature values which are as constant as possible both in the region of the displacement meter and in the region of the pressure difference sensor during measurement and to protect all components from overheating when measuring through-flow processes of measuring fluids at temperatures of up to 200° C.

SUMMARY

An aspect of the present invention is to provide a device for measuring through-flow processes of fluids with which the through-flow processes/profiles can be measured reliably over a long period even at high temperatures of the measuring fluid without having to fear a failure of the electrical components or inaccuracies of the measurement by varying temperatures.

In an embodiment, the present invention provides a device for measuring through-flow processes of fluids. The device includes an inlet, an outlet, a flow housing configured to have a fluid flow therethrough, a drivable displacement meter arranged in the flow housing, a bypass line configured to bypass the drivable displacement meter, a pressure difference sensor arranged in the bypass line and in the flow housing, an evaluation and control unit configured to provide a control of the drivable displacement meter based on a pressure difference existing at the pressure difference sensor, and a cooling channel configured to have a coolant flow therethrough arranged in the flow housing.

BRIEF DESCRIPTION OF THE DRAWINGS

The present invention is described in greater detail below on the basis of embodiments and of the drawings in which.

DETAILED DESCRIPTION

Figure 1:
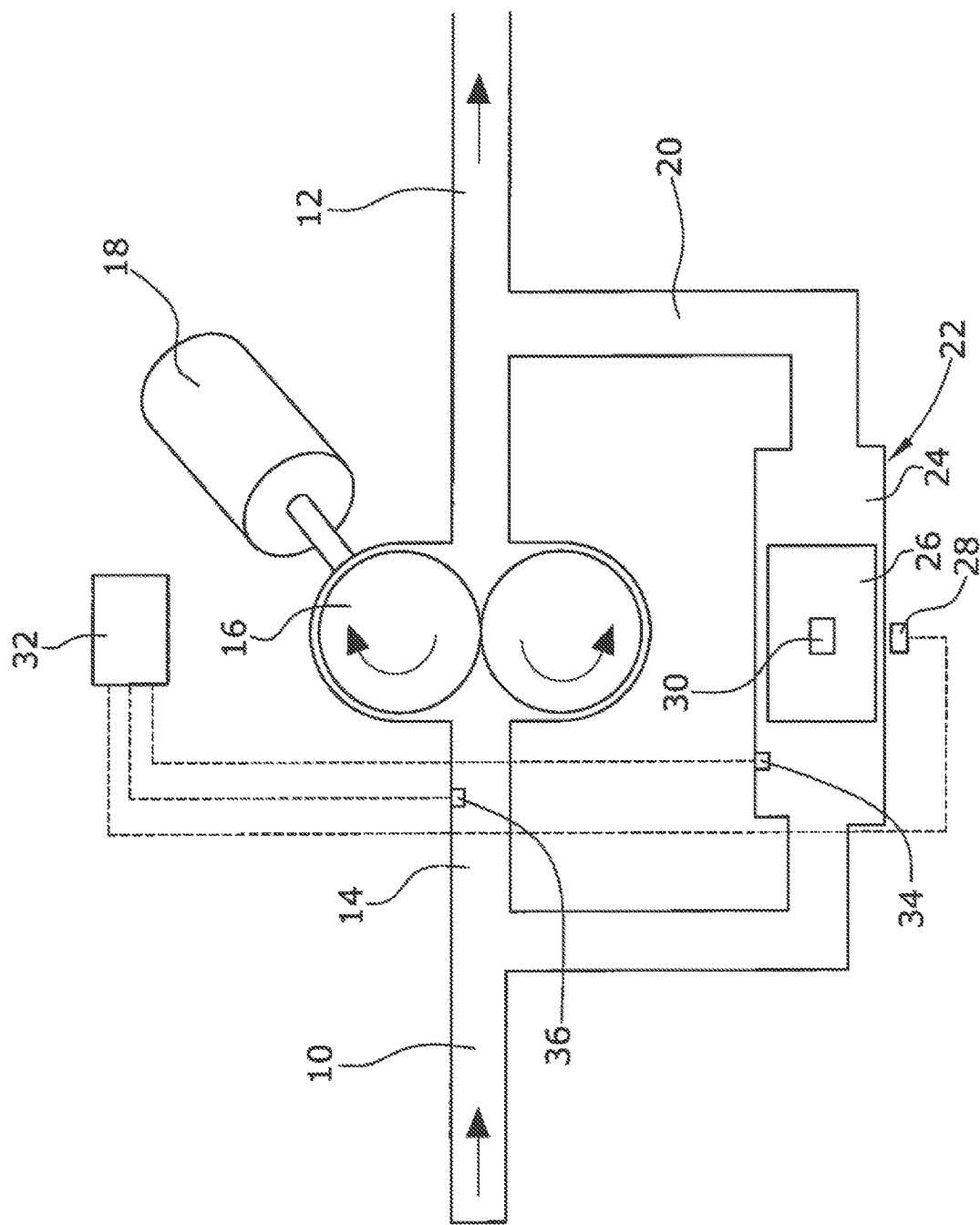
FIG. 1 shows a schematic illustration of a device of the present invention for measuring through-flow processes of fluids.

Because a cooling channel adapted for coolant through-flow is formed in the flow housing, heat can actively be withdrawn directly at the region through which measuring fluid flows so that active cooling can be performed also for measuring fluids at high temperatures, whereby both the measuring chamber itself can be maintained at constant temperatures and the thermal radiation towards the surrounding sensitive electronic components is reduced significantly. This results in better measuring results and a longer service life of the measuring system.

In an embodiment of the present invention, the device can, for example, comprise at least one heat tube via which heat can be transferred from heat generating components of the device to the coolant flowing through the cooling channel. Such heat tubes, also referred to as "heat pipes", have previously been described. They comprise a hermetically encapsulated volume in the form of a pipe provided with a working medium which, for the smaller part, fills the volume of the pipe in the liquid state and, for the greater part, in the vaporous state. A respective heat transfer surface is provided therein for the electronic components that serve as the heat source and for the flow housing flowed through by coolant and serving as the heat sink. The working medium starts to evaporate in the heat tube due to the thermal input from the electronic components, whereby the pressure in the vapor chamber increases locally, leading to a slight pressure gradient inside the heat tube. The vapor formed therefore flows towards the cooler flow housing, where the vapor again condenses and thus emits the previously absorbed heat to the coolant in the flow housing. The working medium, now liquid, returns towards the electronic components due to capillary forces. The cooling channels in the flow housing thus serve both to dissipate the heat of the electronic components, such as control boards, evaluation and control electronics, or windings in electric motors, and to dissipate the heat from the housing heated by the measuring fluid.

In an embodiment of the present invention, a section of the cooling channel can, for example, extend around the displacement chamber so that the heat of the measuring fluid can be dissipated directly at the site where the measuring is performed and where a connection to thermally sensitive electric components, such as the drive unit, exists. A thermal overload is thereby reliably avoided.

In an embodiment of the present invention, the section of the cooling channel extending around the displacement chamber can, for example, be formed as a groove in a surface of the housing directed to a drive unit and be closed by the drive unit. The thermal load on the drive unit is thus further reduced since the drive unit is in direct contact with the coolant and is additionally thermally shielded so that the thermal radiation from the displacement chamber to the drive unit is also reduced.

It is advantageous if the drive unit comprises a housing of a magnetic clutch or of an electric motor by which the groove is closed. The housing is thereby immediately connected thermally with the cooled flow housing, whereby the heat generated at the stator windings of the electric motor or in the magnetic clutch can be dissipated via the coolant.

In an embodiment of the present invention, a first heat tube can, for example, extend along the drive unit towards the flow housing, in particular along the stator of the electric motor and along the control board. The heat generated at the drive unit can thereby be dissipated via the heat tube with a high level of efficiency from its electronic unit and from the electric motor, which both serve as a heat source for the heat tube.

The flow housing has a receiving opening therefor into which the heat tube protrudes so that, in the flow housing, the heat tube can be guided directly to the cooling channel so that a low temperature of the heat sink is provided. The assembly of the heat tube is also simplified since the heat tube is simply plugged in.

It is further advantageous if at least one heat tube extends from a first flow housing part of the flow housing, in which the displacement meter is arranged, to a circuit board with a sensor for detecting the position of the pressure difference sensor. Heat generated at the circuit board in the region of the position sensor is thereby also dissipated, and the measuring results thereof are not subject to temperature influences.

In an embodiment of the present invention, the circuit board can, for example, be arranged in a second flow housing part of the flow housing in which the pressure difference sensor is received and which is fastened on the first flow housing part. This second flow housing part, in which the pressure difference sensor is arranged, is correspondingly also thermally coupled with the cooled first flow housing part.

In an embodiment of the present invention, the first flow housing part and the second flow housing part can, for example, each have a first and a second receiving opening, wherein a first heat tube extends from the first receiving opening of the first flow housing part into the first receiving opening of the second flow housing part, and a second heat tube extends from the second receiving opening of the first flow housing part into the second receiving opening of the second flow housing part. No additional fastening of the heat tubes is accordingly needed. The entire assembly is performed via simple plugging operations. A connection of the circuit board serving as the heat source to the first flow housing part serving as the heat sink is thus established in a simple manner and, correspondingly, sufficient heat dissipation is provided also from the region of the pressure difference sensor even if hot measuring fluids are used.

A particularly good heat dissipation and a small required structural space are achieved if the at least one heat tube extends in parallel with the circuit board so that heat can be withdrawn over the entire surface of the circuit board.

A particularly effective cooling and a simultaneous simplified assembly and manufacture is obtained when a first side of the first flow housing part is formed with an inlet and an outlet of the cooling channel, which open into an inlet channel section and an outlet channel section, which respectively extend from the inlet and from the outlet towards the opposite side of the first flow housing and are connected through at least one transverse channel section. The entire flow housing part in this embodiment is uniformly cooled by the coolant and can thus serve as the heat sink in its entirety.

In an embodiment of the present invention, a first transverse channel section can, for example, extend from the inlet channel section to the section of the cooling channels that surrounds the displacement chamber, and the section of the cooling channel that surrounds the displacement chamber can, for example, extend into a second transverse channel section which opens into the outlet channel section. A forced flow around the displacement chamber is thus provided and a forced uniform flow through the remaining flow housing part is also simultaneously provided.

The quantity of coolant flowing through the cooling channel can, for example, be controllable. This may be realized, for example, via upstream flaps or valves or variable circulation pumps. This control of the coolant flow allows for an exact setting of the temperatures in the displacement chamber or in the measuring chamber of the pressure difference sensor. A control of this quantity of coolant can also be effected to depend on the operating temperatures of the measuring medium.

A device for measuring through-flow processes of fluids is thus provided which is simple to assemble and is controllable with respect to temperature so that overheating of heat-sensitive components is reliably avoided. This results in a longer service life of the device and above all in measuring results that are very exact over the entire service life. Even time-resolved through-flow processes can thus be measured over a long period with high precision and independently from the measuring medium. The device is simple to manufacture and to assemble so that no significant additional costs are incurred despite the extension of service life.

The device of the present invention for measuring through-flow processes of fluids will be described below with reference to a non-limiting embodiment shown in the drawings.

The device for measuring through-flow processes of fluids illustrated in FIG. 1 comprises an inlet 10 and an outlet 12 which are connected with each other via a main conduit 14 in which a rotary displacement meter 16 is arranged which is designed as a gear pump.

Through the inlet 10, a fluid to be measured, in particular a fuel, flows from a device causing a through-flow, in particular a high-pressure fuel pump, and at least one injection valve, into the main conduit 14, and is conveyed by the rotary displacement meter 16, which can be driven by a drive unit 18, i.e., a drive motor.

A bypass line 20 branches from the main conduit 14 between the inlet 10 and the rotary displacement meter 16, which bypass line 20 again opens into the main conduit 14 downstream of the rotary displacement meter 16 between the rotary displacement meter 16 and the outlet 12 and, like the main conduit 14, is fluidically connected with the inlet 10 and the outlet 12. A translational pressure difference sensor 22 is arranged in the bypass line 20, which translational pressure difference sensor 22 is formed by a measuring chamber 24 and a piston 26 arranged in the measuring chamber 24 so as to be freely displaceable in the axial direction, the piston 26 having the same specific weight as the measuring fluid, i.e., the fuel, and being cylindrical in shape like the measuring chamber 24. The measuring chamber 24 thus has an inner diameter which substantially corresponds to the outer diameter of the piston 26.

Due to the fuel being conveyed by the rotary displacement meter 16, the injection of the fuel into the inlet 10, the fluidic connection of the inlet 10 with the front side of the piston 26, and the connection of the outlet 12 with the rear side of the piston 26 via the bypass line 20, a pressure difference can be created between the front and the rear side of the piston 26 which causes an excursion of the piston 26 from its rest position. The excursion of the piston 26 accordingly is a measure of the prevailing pressure difference.

For a correct determination of this excursion, a magneto-resistive sensor 28 is arranged at the measuring chamber 24, which magneto-resistive sensor 28 is operatively connected to a magnet 30 fastened in the piston 26 and in which the excursion of the piston 26 generates a voltage which depends on the magnitude of excursion of the piston 26. The magnitude of excursion of the piston 26 depends on the magnetic field of the magnet 30 acting on the magneto-resistive sensor 28, which varies due to the movement thereof both with respect to the direction and to the magnitude of the flux lines.

The magneto-resistive sensor 28 is connected with an evaluation and control unit 32 which processes the values from the magneto-resistive sensor 28 and transmits corresponding control signals to the drive unit 18, which can, for example, be controlled so that the piston 26 always is in a defined initial position, i.e., so that, by conveying, the rotary displacement meter 16 continuously approximately balances out the pressure difference generated at the piston 26 because of the fuel injected. For this purpose, the excursion of the piston 26 or the volume displaced by the piston 26 in the measuring chamber 24 is converted into a desired feed volume of the rotary displacement meter 16 or a rotational speed of the drive unit 18, using a transfer function, and the drive unit 18 is energized accordingly.

A pressure sensor 34 is additionally arranged in the measuring chamber 24, which pressure sensor 34 continuously measures the pressures occurring in this region. A temperature sensor 36 is also located in the main conduit 14 for measuring the current fluid temperature. Both measuring values are again supplied to the evaluation and control unit 32 so that changes in density can be taken into account in the calculation.

The procedure of the measuring is such that, when a total flow rate to be determined is calculated in the evaluation and control unit 32, both a flow rate in the bypass line 20 which is generated by the movement or the position of the piston 26 and the volume displaced thereby in the measuring chamber 24, and an actual flow rate of the rotary displacement meter 16 during a defined time interval are taken into account, and both flow rates are summed to determine the total flow rate.

The determination of the flow rate at the piston 26 is performed, for example, so that, in the evaluation and control unit 32 connected to the magneto-resistive sensor 28, the excursion of the piston 26 is differentiated and subsequently multiplied by the base surface of the piston 26 so that a volume flow in the bypass line 20 in this time interval is obtained.

The flow rate through the rotary displacement meter 16, and thus through the main conduit 14, can be determined either from the control data obtained for controlling the rotary displacement meter 16 or by the rotational speed, if the rotational speed is measured directly by optical encoders or magneto-resistive sensors.

Figure 2:
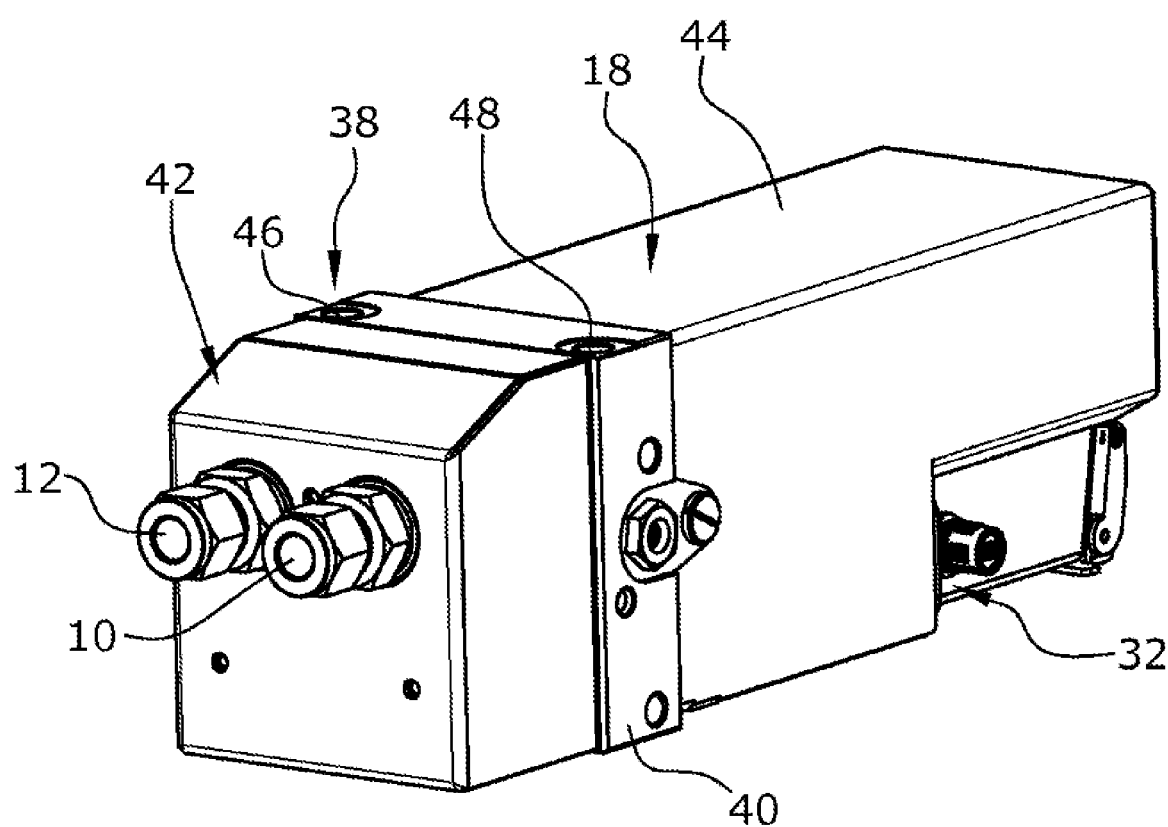
FIG. 2 shows a schematic outside view of a device according to the present invention.
Figure 3:
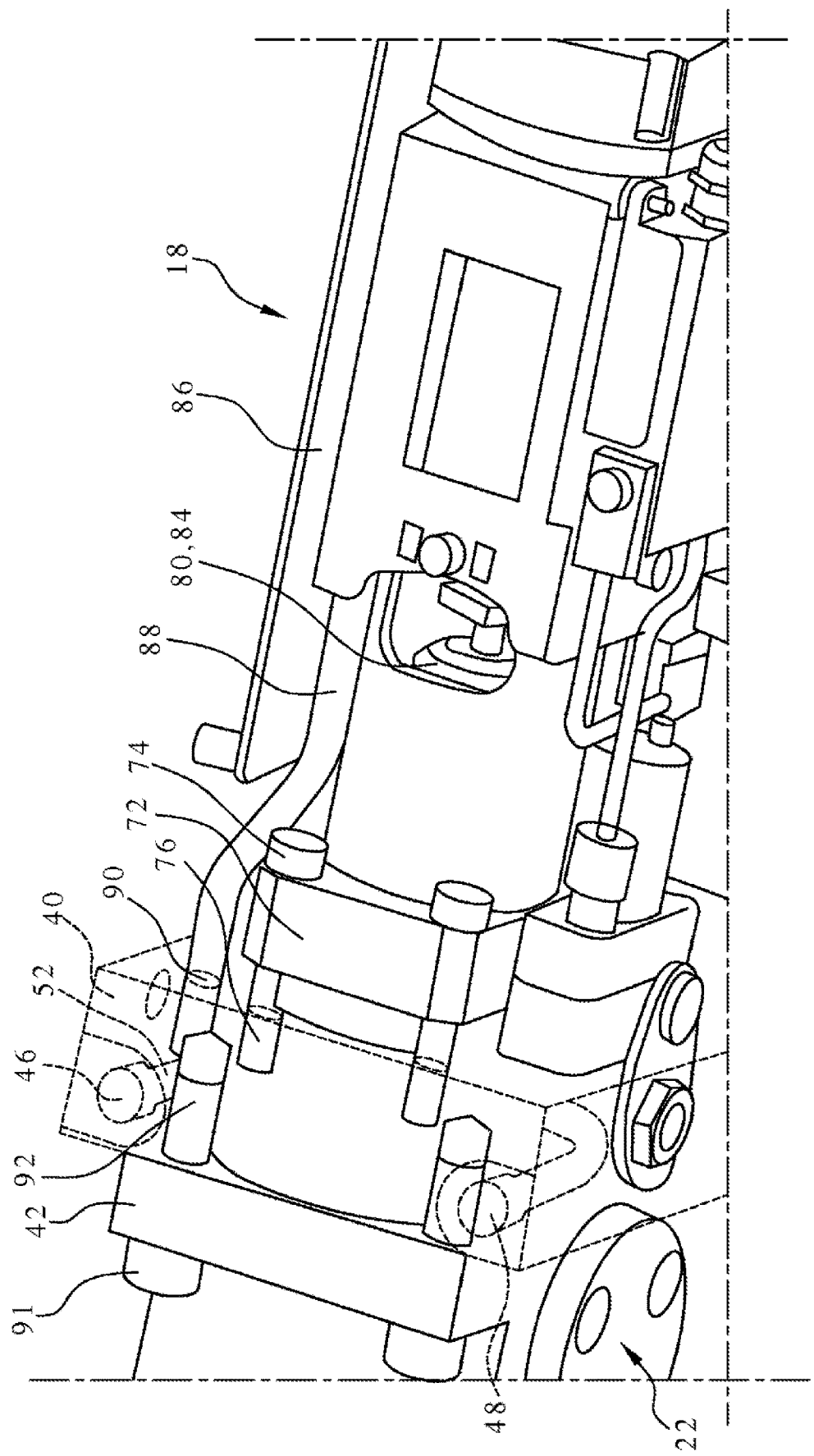
FIG. 3 shows a detail of a perspective outside view of the device according to the present invention with the first flow housing part illustrated transparently and with the cover not mounted.

FIG. 2 is a view on the outer side of such a device of the present invention for measuring time-resolved through-flow processes. The device comprises a flow housing 38 of a bipartite structure, wherein the rotary displacement meter 16 is arranged in the first flow housing part 40, and the translational pressure difference sensor 22, as well as the inlet 10 and the outlet 12, are formed in the second flow housing part 42. The drive unit 18 of the rotary displacement meter 16, as well as the evaluation and control unit 32, are arranged inside a cover 44 that, like the second flow housing part 42, is fastened to the first flow housing part 40. Two further openings can be seen at a top surface of the first flow housing part 40 which, according to the present invention, serve as a coolant inlet 46 and as a coolant outlet 48 of a cooling channel 50 through which coolant flows and which is formed in the first flow housing part 40.

Figure 5:
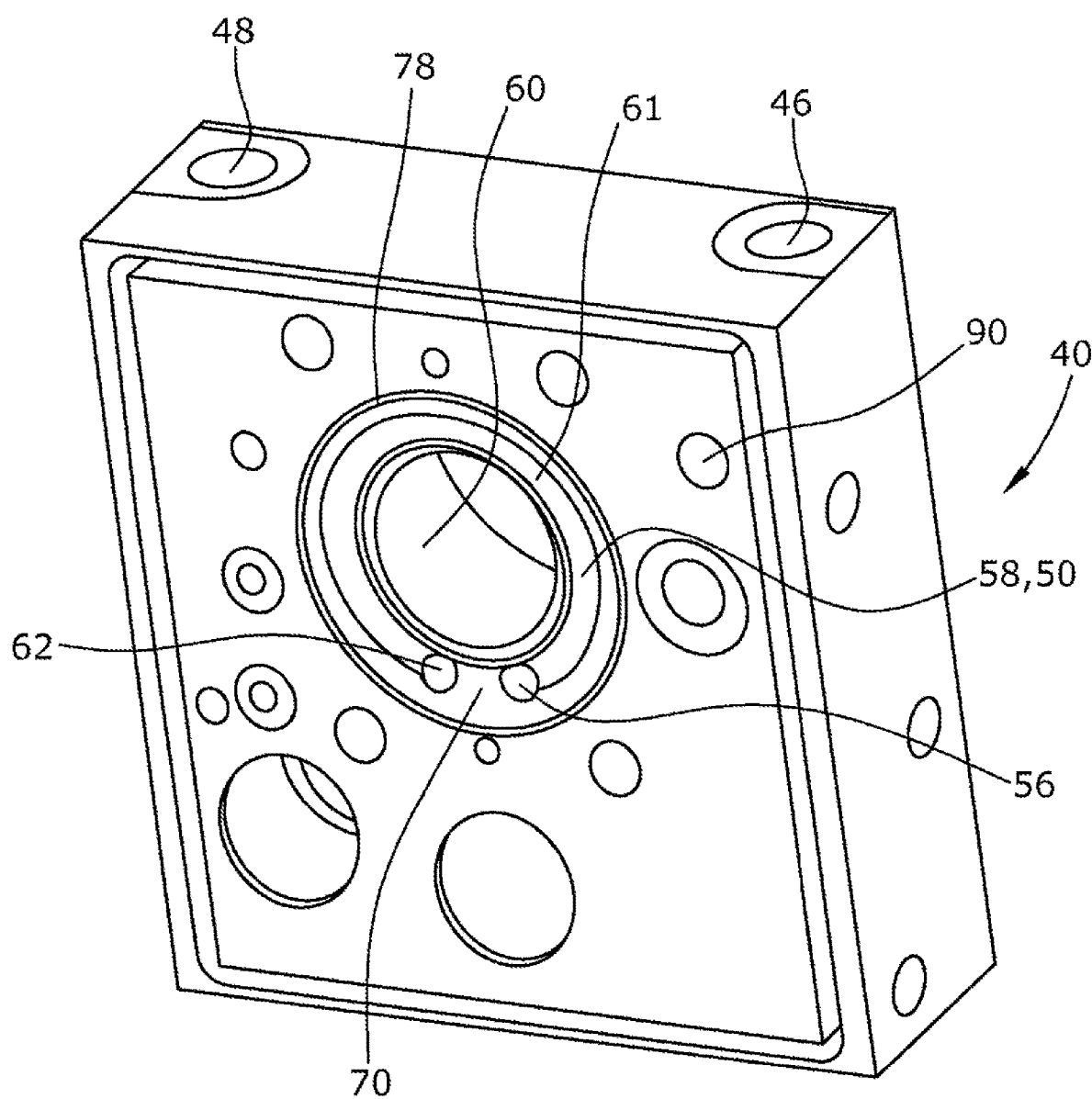
FIG. 5 shows a perspective view of the first flow housing part from the direction of the drive unit.
Figure 6:
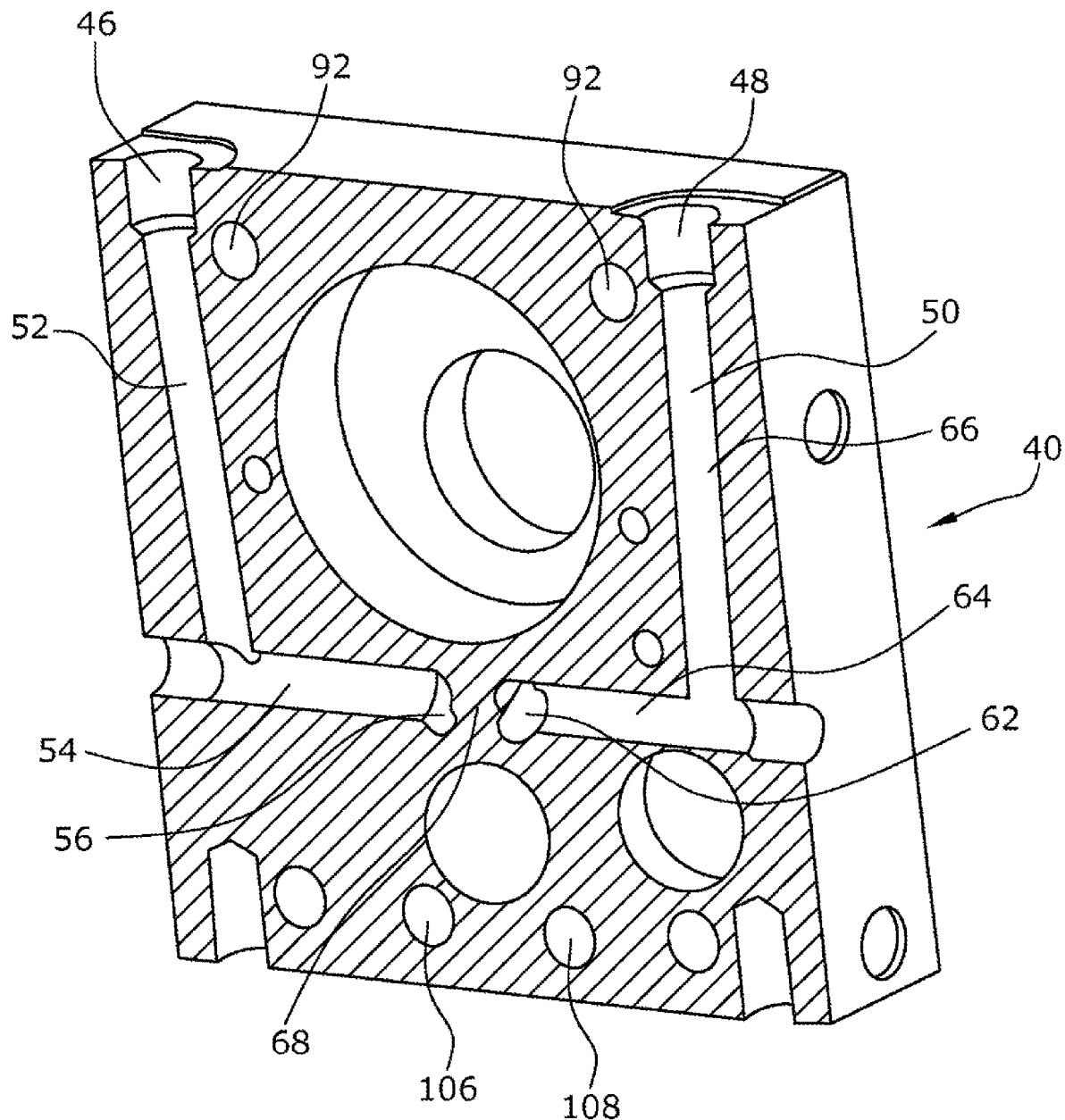
FIG. 6 shows a perspective sectional view of the first flow housing part as seen from the direction of the second flow housing part.

The course of this cooling channel 50 can be seen in FIGS. 5 and 6 in which the first flow housing part 40 is illustrated. Coolant flows from the coolant inlet 46 into an inlet channel section 52 that extends vertically to the opposite side of the of the first flow housing part 40, the inlet channel section 52 opening into a first transversal channel section 54 extending vertically thereto. The first transversal channel section 54 is connected with a section 58 of the cooling channel 50 via a first connection bore 56, the section 58 extending around a displacement chamber 60 in which the rotary displacement meter 16 is arranged. This section 58 is situated on a side of the first flow housing part 40 directed towards the drive unit 18 and is formed as an open groove 61. The coolant then flows via a second connection bore 62 into a second transversal channel section 64 which in turn opens into an outlet channel section 66 leading vertically to the coolant outlet 48. Both the first and the second transversal channel sections 54, 64 are formed as bores and are closed to the outside by stoppers (not shown in the drawings). An interruption region 68 is located between the first and the second transversal channel sections 54, 64 which forces a forced flow through the section 58 surrounding the displacement chamber 60. In order to provide this forced flow from the coolant inlet 46 to the coolant outlet 48 and to avoid dead spaces, this section 58 also has a short interruption region 70.

The open groove 61 formed in FIG. 5 and serving as the section 58 of the cooling channel 50 is closed, as can be seen in FIG. 6, by a housing 72 of a magnetic clutch 73, which is fastened to the first flow housing part 40 using screws 74 screwed into threaded bores 76 in the first flow housing part 40, which housing 72 is fastened with interposition of a seal that fully surrounds the section 58 of the cooling channel 50 and is arranged in a further groove 78 of the first flow housing part 40.

The housing 72 surrounds the magnetic clutch 73 whose outer rotor is driven by an electric motor 80 via which a displacement gear 82 of the rotary displacement meter 16, which is designed as an inner gear pump, is driven. In operation, a wound stator 84 of this electric motor 80 emits heat to the environment, as does a control board 86 for controlling the electric motor 80, which extends in parallel with the electric motor 80 and on which, among others, heat-generating power transistors are arranged. In order to prevent a resulting heating of the drive unit 18 within the cover 44, a first heat tube 88, designed as a "heat pipe", extends between the control board 86 and the electric motor 80 in the direction of the extension of the control board 86 and the electric motor 80 up to the immediate vicinity of the inlet channel section 52 of the cooling channel 50 in the first flow housing part 40. The first flow housing part 40, which serves as a heat sink for the first heat tube 88, is formed with a first receiving opening 90 into which the first heat tube 88 protrudes therefor. The heat generated by the drive unit 18, and in particular by the control board 86 and the wound stator 84 of the electric motor 80, is quickly dissipated to the coolant via the first heat tube 88 due to the extremely low thermal resistance of the tube, and to the outside via the coolant so that a heating of the drive unit 18 is reliably and immediately prevented at the location where the heat is generated.

Figure 4:
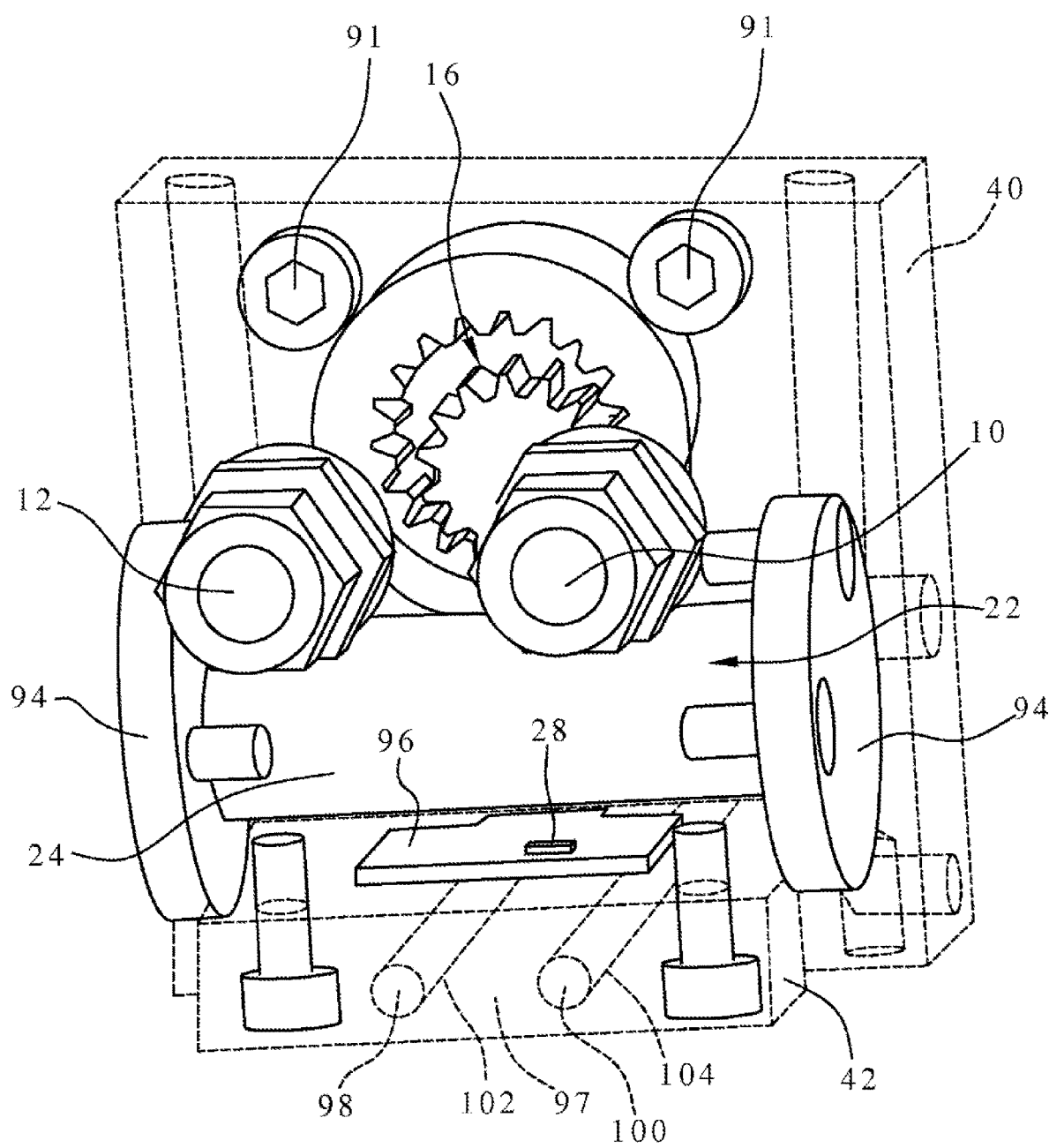
FIG. 4 shows a detail of a perspective front view with the second flow housing part shown transparently.

FIG. 4 shows the connection between the first and the second flow housing parts 40, 42 by screws 91 inserted through the second flow housing part 42 and screwed into threaded bores 92 of the first flow housing part 40. The transparently illustrated second flow housing part 42 is formed with the inlet 10 and the outlet 12 which, via flow paths (which are not shown in detail in the drawings), are connected in a manner known per se with the rotary displacement meter 16 and the measuring chamber 24, which is also visible, and is closed on either side by flanges 94. A circuit board 96 is arranged beneath the measuring chamber 24, which circuit board 96 is fastened on a lower cover part 97 of the second flow housing part 42. The magneto-resistive sensor 28 is arranged on the circuit board 96, which magneto-resistive sensor 28 corresponds with the magnet 30 in the piston 26 of the translational pressure difference sensor 22.

For a reliable dissipation of heat reaching the magneto-resistive sensor 28 from the measuring chamber 24 because of the temperature of the measuring fluid or of heat generated by electronic components of the circuit board 96, which could compromise the functionality of the magneto-resistive sensor 28, a full-surface fastening of the second flow housing part 42 on the first, cooled first flow housing part 40 is provided, and a dissipation of the heat via two further parallel heat tubes 98, 100 is provided, the heat tubes also being designed as "heat pipes". Both heat tubes 98, 100 extend in parallel in the direction of the extension of the circuit board 96 from correspondingly oriented receiving openings 102, 104 in the second flow housing part 42 into correspondingly shaped receiving openings 106, 108 in the first flow housing part 40, which are arranged opposite the first two receiving openings 102, 104. Accordingly, by evaporation of the liquid in the "heat pipes" 98, 100, the heat present in the measuring chamber 24 and generated at the circuit board 96 is dissipated towards the first flow housing part 40 serving as a heat sink and via the coolant flowing in the cooling channel, whereupon the liquid again evaporates in the heat tubes 98, 100 and is transported towards the second flow housing part 42 again by capillary action. Large heat quantities can accordingly be continuously transported from the second flow housing part 42 to the first flow housing part 40 and can be dissipated from there via the coolant in the cooling channels. In order to be able to set a temperature in the region of the measuring chamber 24 and the rotary displacement meter 16 that is as constant as possible, yet different depending on the temperature of the measuring liquid, the volume flow of the coolant in the cooling channel 50 is adjustable, wherein the adjustment may be effected either by a variable pump or via corresponding control elements in the form of flaps or valves.

Such a device for measuring through-flow processes of fluids operates with high precision and continuously supplies time-resolved measuring results. This is provided for measuring liquid temperatures up to 200° C. due to the good heat dissipation both from the housing parts and from the electronics since heat-sensitive components are reliably protected against overheating by the existing cooling provided by the "heat pipes" and by the cooling channel. The service life of the electronics and of the electric motor correspondingly increases. Despite the cooling provided, the manufacture and the assembly remain simple. No long cooling coils where leaks could occur are in particular are required. The cooling channels are instead formed as bores and grooves in only one housing part which must be correspondingly worked, the bores and grooves being simple to realize. The use of heat tubes still allows for a dissipation of large quantities of heat in a reliable manner and from the site of its generation. The housing itself, which is heated by the measuring liquid, as well as the seal provided thereon, are also protected in a corresponding manner since their heat is dissipated.

It should be clear that the present invention is not limited to the embodiment described, but that various modifications are possible. The arrangement of the channels and the housing separations can be modified as well as the design of the displacement meter, which may also be designed, for example, as a double gear pump or a vane pump. It is also possible to appropriately arrange additional "heat pipes" for cooling the evaluation unit of the device. Reference should also be had to the appended claims.

What is claimed is:

1. A device for measuring through-flow processes of fluids, the device comprising:
an inlet;
an outlet;
a flow housing configured to have a fluid flow therethrough;
a drivable displacement meter arranged in the flow housing, the drivable displacement meter comprising a displacement chamber;
a bypass line configured to bypass the drivable displacement meter;
a pressure difference sensor arranged in the bypass line and in the flow housing;
an evaluation and control unit configured to provide a control of the drivable displacement meter based on a pressure difference existing at the pressure difference sensor;
a cooling channel configured to have a coolant flow therethrough arranged in the flow housing, the cooling channel comprising a section which is arranged to extend around the displacement chamber; and
a drive unit,
wherein,
the section of the cooling channel which is arranged to extend around the displacement chamber is formed as a groove in a surface of the flow housing directed to the drive unit, and
the groove is closed by the drive unit.

2. The device as recited in claim 1, further comprising:
at least one heat tube via which heat from heat-generating components of the device can be transferred to the coolant flowing through the cooling channel.

3. The device as recited in claim 1, wherein,
the drive unit comprises a housing of a magnetic clutch or of an electric motor, and
the groove is closed via the housing.

4. The device as recited in claim 3, wherein the at least one heat tube is arranged to extend along the drive unit to the flow housing.

5. The device as recited in claim 4, further comprising:
a control board,
wherein,
the electric motor comprises a stator, and
the at least one heat tube is arranged to extend at least along the stator of the electric motor and along the control board.

6. The device as recited in claim 4, wherein the flow housing comprises a receiving opening into which the at least one heat tube protrudes.

7. The device as recited in claim 1, further comprising:
a circuit board comprising a sensor which is configured to detect a position of the pressure difference sensor,
wherein,
the flow housing comprises a first flow housing part,
the drivable displacement meter is arranged in the first flow housing part of the flow housing, and
the at least one heat tube is arranged to extend from the first flow housing part to the circuit board.

8. The device as recited in claim 7, wherein,
the flow housing further comprises a second flow housing part,
the first housing part is fastened to the second housing part, and
the pressure difference sensor is arranged in the second flow housing part.

9. The device as recited in claim 8, wherein,
the first flow housing part and the second flow housing part each comprise a first receiving opening and a second receiving opening,
the at least one heat tube comprises a first heat tube and a second heat tube,
the first heat tube is arranged to extend from the first receiving opening of the first flow housing part into the first receiving opening of the second flow housing part, and
the second heat tube is arranged to extend from the second receiving opening of the first flow housing part into the second receiving opening of the second flow housing part.

10. The device as recited in claim 9, wherein at least one of the first heat tube and the second heat tube is arranged to extend in parallel with the circuit board.

11. The device as recited in claim 7, wherein,
the cooling channel comprises a coolant inlet and a coolant outlet,
the first flow housing part comprises a first side which is formed with the coolant inlet and the coolant outlet of the cooling channel,
the coolant inlet opens into an inlet channel section which is arranged to extend from an opposite side of the first flow housing part,
the coolant outlet opens into an outlet channel section which is arranged to extend from the opposite side of the first flow housing part, and
the inlet channel section and the outlet channel section are connected with each other via at least one transversal channel section.

12. The device as recited in claim 11, wherein,
the at least one transversal channel section comprises a first transversal channel section and a second transversal channel section, the second transversal channel section being arranged to open into the outlet channel section,
the first transversal channel section is arranged to extend from the inlet channel section to the section of the cooling channel surrounding the displacement chamber, and
the section of the cooling channel surrounding the displacement chamber is arranged to extend into the second transversal channel section.

13. The device as recited in claim 1, wherein a quantity of the coolant flowing through the cooling channel is controllable.

* * * * *